Patented Oct. 13, 1942

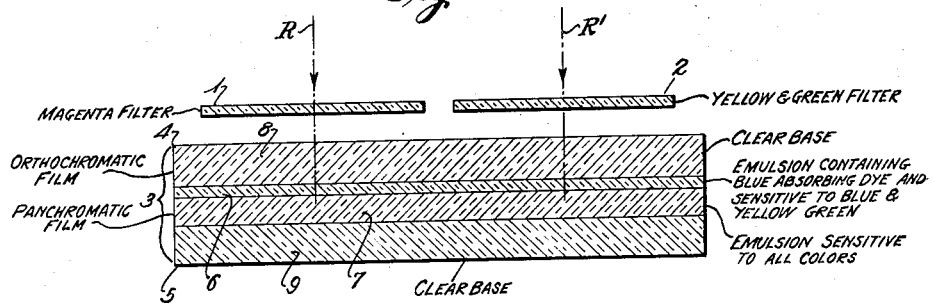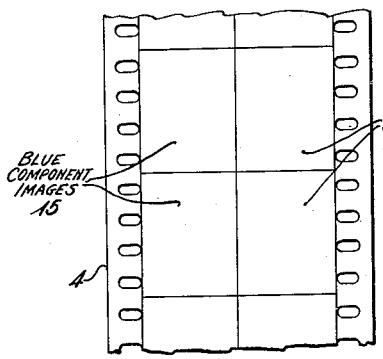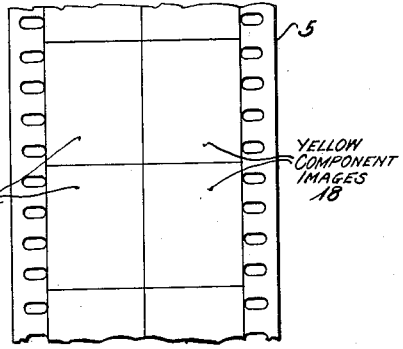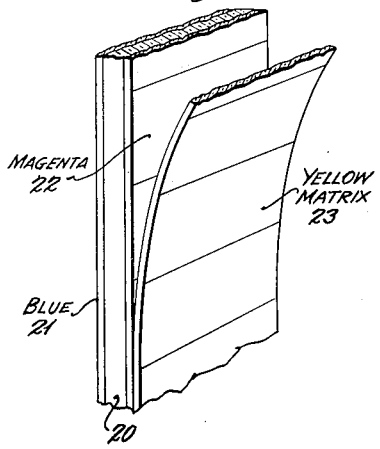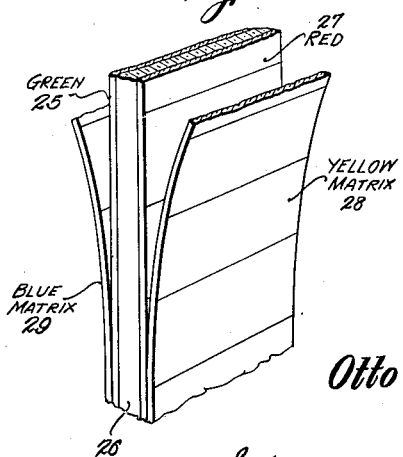

2,299,015

UNITED STATES PATENT OFFICE 2,299,015

COLOR PHOTOGRAPHY

Otto C. Gilmore, Van Nuys, Calif., assignor to Cosmocolor Corporation, New York, N. Y., a corporation of Delaware Application November 28, 1938, Serial No. 242,812

1 Claim. (Cl. 95—2)

The present invention relates to color photography and more particularly to a process of producing such photographs comprising three or four colors, by recording the component color values of an object in the form of black and white images.

It has long been the practice in making photographs in color to use one of two main processes; a plurality of color component negative images are formed either by a light splitting method wherein the images are separated prior to their being recorded upon the negative film, or by the multipack system wherein a plurality of light sensitive emulsion layers are simultaneously exposed through the use of a single objective. There have been many inherent defects in both of these methods due to the fact that the quality of color reproduction is apt to be lost in the light splitting system, and definition was prone to suffer in the multipack method due to the fact that it has been the practice to incorporate filter dyes or filter layers within or between the superimposed light sensitive emulsion layers which cause a diffusion of the light image to be impressed upon the emulsion layers that are the farthest removed from the object being photographed.

In application Serial No. 60,776 filed January 25, 1936, by this same inventor, a method and apparatus are described by which the light from any given scene is split into two portions to form two light beams carrying identical images. The beams are filtered according to the complementary colors to produce color component images and finally recorded on a sensitized emulsion of the ordinary black and white variety. From these negative records in black and white, positives can be made which may be toned or dyed and combined to form a color record of the original scene. Other methods may be used for obtaining the color component images such as exposing two full images by means of a double film gate and pull-down mechanism, two or more images may be recorded in an upright position in a single image area of the film, or the images may be recorded upon separate films if desired. If preferred, black and white positives made from the black and white negatives, projected through suitable filters, and superimposed on a screen to reproduce the original image in color may be used. Excellent results may be obtained by this process, but it is sometimes desired to divide the record of the original scene into more than two parts and to make records of more than two of its color components. To do this by dividing the light from the given scene into more than two parts is generally unsatisfactory because it so reduces the amount of light in any one part as to make it difficult to record and, in addition, greatly complicates the camera mechanism that is necessary.

Accordingly, it is an object of the present invention to overcome the above mentioned defects and to provide a method incorporating either three or four colors whereby photographs may be obtained having a high quality of color reproduction and at the same time obtain sharp definition of the images. In addition, the present invention contemplates the combination of the more desirable features of both the light splitting and multipack methods, in the elimination of the defects inherent in these methods. Likewise, satisfactory results are more virtually assured by the present invention so that the number of pictures which have to be rephotographed is decidedly reduced. Furthermore, the subject matter of the present invention is comparatively inexpensive to produce and may be operated with ordinary equipment and by regularly trained technicians without the aid of specialists in the art.

Briefly, for example, according to the present invention four color records, all in black and white, may be produced with practically the same camera mechanism as has been previously used for making two color records. The optical image of an object may be divided into two identical images and recorded upon a photographic element which may comprise a pair of films, one of which consists of an orthochromatic light sensitive silver-halide emulsion layer coated upon a transparent support, and the other of which consists of a panchromatic light sensitive silver-halide emulsion layer coated upon any suitable support. The two identical images may be passed through a pair of filters having complementary colors such as magenta and green, preferably a yellowish green, before they are recorded upon the above-mentioned emulsion layers. The emulsion layers are arranged so that they lie next to each other with the orthochromatic emulsion positioned nearer the photographic objective. By this arrangement black and white color component negative images are recorded upon these emulsion layers, and due to the difference in the sensitivity of the two emulsions pre-determined component images will be recorded upon each of the emulsions.

In selecting the two films to be combined, it is decidedly necessary to use the proper emulsions to preclude the requirement of additional filter layers or filter dyes. Consequently, the film positioned nearest the filters is of the orthochromatic variety, that is, it is quite sensitive to the colors at the blue end of the spectrum, namely blue and green. This orthochromatic emulsion must be quite insensitive to such colors as are in the red end of the spectrum, namely red and yellow. To produce a film of this nature, the emulsion has incorporated therein a yellow dye which tends to absorb practically all of the light at the blue end of the spectrum and to pass all of the light at the red end of the spectrum. By the use of such a dye the necessity of yellow filters is unnecessary.

The second film which lies farthest from the filters but with its emulsion in contact with the emulsion of the first film is provided with a panchromatic emulsion which is very sensitive to all colors. Preferably a panchromatic emulsion is used which is highly sensitive and particularly to the light at the red end of the spectrum. As the first mentioned film absorbs most of the light in the blue end of the spectrum, the second film will be affected only by the light in the red end of the spectrum. In order to secure evenly exposed images the ortho film is provided with an extremely thin fine grained translucent emulsion layer and the panchromatic film is provided with a rather fast, fine grained emulsion layer.

As the magenta filter passes only blue and red light and the first film is sensitive only to the blue end of the spectrum, the record on this film of the light that comes through the magenta filter will be only of the blue light. The blue light, however, will be filtered out by this first film and only the red light will pass through it to be recorded on the second film. The light that comes through the green filter, being blue and yellow, will be recorded as green on the first film. The blue light will be filtered out by this film and the yellow light will then cause a recording on the second film, which is sensitive to yellow. As a result, there will be images on the two films corresponding to the color values of blue, green, red, and yellow. These images may be transferred to positive film in any desired way and recombined to form either color transparencies, color projections, or ordinary color photographs.

After these negative films are developed and treated in the usual manner to produce silver images thereon, the films may be prepared for producing positive prints of the component images according to the number of colors it is desired to incorporate within the process. A positive print is then made from these negatives, the complementary images being printed in registration upon a double coated or duplitized positive film. The emulsion layers of this positive film may preferably contain dyes that are complementary to each other and are insensitive to the action of light and to the photographic treating solutions. The third and/or fourth colors may be added to the positive in the form of a matrix which may be imbibed, in registration, upon one or both sides of the positive film as is well known. If preferred, a multi-coated positive film may be used which comprises three or four emulsion layers, each of said layers being adapted to record the component images representing one of the complementary colors. These emulsions may be on one or both sides of the support.

The invention both as to its organization and method of operation, together with additional objects and advantages thereof, will best be understood from the following description of the specific embodiment when read in connection with the accompanying drawing, wherein like reference characters indicate like parts throughout.

Fig. 1 is a diagrammatic view in cross section of the photographing step with a multipack photographic element;

Fig. 2 is a plan view of one of the negative films included in the photographic element, which is shown as being of the motion picture variety;

Fig. 3 is a plan view of the other of said negative films;

Fig. 4 is a diagrammatic view in perspective of a three-color positive prepared from the separated negative films; and Fig. 5 is a diagrammatic view in perspective of the four-color positive prepared from the separated negative films.

With reference to the drawing, and specifically to Fig. 1, the image of an object may be divided to produce two identical images, indicated as rays R and R' and passed through colored filters 1 and 2, whereupon said images may be recorded upon the multipack photographic element 3. This photographing step may be accomplished according to the process described in the present inventor's United States Patent Number 2,137,570 issued November 22, 1938. If preferred, the recording may be made on two different films, recording two full sized images by means of a double pull-down, or by other well known processes. The filters 1 and 2 may comprise complementary colors, and for instance the filter 1 may be magenta and the filter 2 may be green and preferably yellowish green. The multipack photographic element 3 may be composed of two photographic films 4 and 5 which may comprise transparent supports 6 and 7 and light-sensitive emulsions 8 and 9. In other words, the multipack photographic element 3 may be composed of the two photographic films 4 and 5, the photographic film 4 comprising a transparent base 6 and a light-sensitive emulsion 8, the film 5 comprising an ordinary base 7 and a light-sensitive emulsion 9. These films 4 and 5 are arranged so that their emulsion layers 8 and 9 lie adjacent to each other and within the middle of the pack.

The sensitivity of the two photographic emulsions is selected in such a manner that they react differently to the action of differently colored light so that when exposed to the action of light of a different composition, the front emulsion, in one case, and the rear emulsion, in the other case, show a higher sensitivity. This effect is gained in a very simple manner by providing at the front a photographic emulsion known as orthochromatic which has been sensitized specially for the blue light rays. An emulsion is used in the rear which is sensitized for all of the spectrum and particularly the red and yellow light, and is known as a panchromatic emulsion, said emulsion having a somewhat lower speed in the blue region.

In order to prevent the necessity of the incorporation of a yellow filter dye or layer, which promotes diffusion of the image and lack of definition, the orthochromatic emulsion 8 has incorporated therewith a yellow dye of a specific type. This yellow dye must be one that will completely absorb the blue light and yet permit substantially all of the yellow and red light to pass therethrough to the panchromatic emulsion 7. It has been found that the orthochromatic film known as "Plenachrome," which is manufactured by the Agfa-Ansco Corporation, will work very satisfactorily for this purpose. On the other hand, the panchromatic emulsion 7, which is sensitive to all colors, preferably contains dyes which are particularly sensitive to the light at the red end of the spectrum, namely the yellows and reds. The panchromatic film which is also manufactured by the Agfa-Ansco Corporation and known as "Supreme" has proved most satisfactory. Furthermore, in order to secure more evenly exposed images, it has been found desirable to substantially reduce the thickness of the orthochromatic emulsion 6. By using an extremely thin and translucent layer the image received by the panchromatic emulsion 7 may be subject to a greater and finer range of exposure. The difference between the thicknesses of these emulsion layers is diagrammatically illustrated in Fig. 1, the panchromatic layer 7 being a standard thickness.

According to this arrangement of the light sensitive emulsion layers, the images are first recorded upon the thin orthochromatic emulsion 6 which is highly sensitive to the blue light and substantially insensitive to the light waves ranging from the yellows to the reds. Consequently, the component images registered upon this emulsion will represent the blue and green components. In like manner, the light rays having passed through the clear transparent support 8 and the thin orthochromatic emulsion 6 to the panchromatic emulsion 7, the images recorded thereon will represent different color components. Due to the fact that the panchromatic emulsion 7 is especially sensitized to the yellows and reds and may be somewhat less sensitive to light in the blue region, the images recorded thereon will represent the red and yellow components respectively. In other words, the yellow and red light rays will pass through the thin orthochromatic emulsion 6 without effect to said emulsion due to the fact that it is not sensitive to this range, and will record only on the panchromatic emulsion 7 which is especially sensitized for the region. Conversely, the blue light rays will record upon the orthochromatic emulsion which is particularly sensitive thereto, said rays being substantially absorbed by this emulsion and having little effect upon the panchromatic emulsion which has a somewhat lower speed in the blue region.

The optical means for recording images upon light sensitive elements has not been shown and described in view of the fact that complete disclosure has been made in United States Patent Number 2,137,570 issued November 22, 1938. According to the method disclosed therein, the image is first turned through an angle of 90° and then divided into two like images so that the recording upon the negative film comprises a pair of images located within the area normally occupied by a single image, said images lying on their sides. By using such a method of photography, and recording upon the multipack photographic element above described, four different color component images may be secured. The images R which are passed through the magenta filter 1 may be recorded upon the thin orthochromatic emulsion 6 as a blue component image and upon the panchromatic emulsion 7 as a red component image. Likewise, the images R' which are passed through the yellowish green filter 2 may be recorded upon the thin orthochromatic emulsion 6 as a green component image and upon the panchromatic emulsion 7 as a yellow component image.

The photographic element 3 after being exposed as above described may then be processed in the usual manner to develop the silver images in the emulsion layers and the films 4 and 5 separated if desired to secure separate negatives. As shown in Fig. 2, the orthochromatic film 4 will have two series of images recorded thereon, one series comprising the blue component 15 and the other series comprising the green component 16. Similarly, as shown in Fig. 3, the panchromatic film 5 will have a series of red components 17 and another series of yellow components 18. In view of the fact that four component images are obtained, these negatives may be used for either a three-color process or a four-color process whichever is preferred.

These negative films are now ready for the printing operation to secure the positive prints thereof. It has been found best to use a double-coated or duplitized positive film in this printing operation, which film comprises two emulsion layers, preferably located on the opposite sides of a support. The emulsion layers carried by this positive film may be of the regular silver-halide positive emulsion type and may contain suitable dyes for coloring the emulsion or the emulsions may be dyed or toned by the usual well known processes after the images are developed. If the dyes are incorporated within the emulsion, it is preferred to use those which are insensitive to the action of light or to the photographic processing solutions so that they will not be affected in the obtaining of the component silver images.

In the printing operation, if it is desired to use a three-color process the red component images 17 may be printed upon one side of the double coated film and the green component images 16 may be printed upon the second emulsion which is preferably carried on the other side of the double-coated film. After this positive film has been processed in the usual manner, the emulsion layers may be dyed or toned in any known manner so that the red component images are toned green. A matrix may then be made from the blue component images 15 and dyed yellow. This yellow matrix may then be imbibed, in registration, upon one of the surfaces of the positive film whereby this multicolor film may be used in any standard photographic projection apparatus to secure natural color pictures.

The positive film obtained by this three-color process is shown in Fig. 4 and comprises a support 20 having an emulsion layer 21 on one side thereof upon which the red component negative images may be printed to secure positive images thereof. An emulsion layer 22 may be located on the opposite side of the support 20 upon which a green component negative image 16 may be printed to secure positive images thereof. The emulsion 21 carrying the positive images of the red component negative images 17 may be dyed or toned blue and the emulsion 22 carrying the positive images of the green component negative images 16 may be dyed or toned magenta. A matrix 23 which has been secured from the blue component images 15 and dyed yellow may be imbibed upon the emulsion 22 of the positive film. If preferred, a positive film bearing three emulsion layers may be used, and these layers may have the dyes incorporated therein to eliminate toning processes as above mentioned.

In the four-color process a positive film as shown in Fig. 5 may be used. In this process the red component negative images 17 may be printed upon an emulsion layer 25 carried by a support 26 and the green component negative images 16 may be printed upon an emulsion layer 27 located on the opposite side of said support 26. The emulsion layer 25 carrying the red component positive images may then be dyed or toned green and the emulsion layer 27 carrying the green component positive images may be dyed or toned red. A matrix 28 may then be made from the blue component images and dyed yellow, and a matrix 29 may be made from the yellow component images 18 and dyed blue. These matrices may then be imbibed, in registration, upon the positive film in any desired manner. As noted above, it is preferred that a positive film comprising four emulsion layers may be used, and these emulsion layers may have the dyes incorporated therein to eliminate the dyeing and toning processes. This four-color film may likewise be used in any suitable standard projection apparatus to secure natural color pictures therefrom.

In the foregoing description of the invention it has been considered unnecessary to illustrate the details of the apparatus or of the methods and processes involved. The various optical apparatus may be of any suitable type and consequently detailed description thereof has been eliminated. Similarly, various well known chemical processes, such as the dyeing, toning, developing, and the like, have not been specifically described in view of the fact that they are well known in the art. Likewise many methods of obtaining the black and white complementary color component negative images may be used and these images may be arranged on one or more films in any desired manner. Similarly the common practice of producing lavenders from the original negative images and optical negatives from said lavenders for use in producing the ultimate positive prints may be used instead of producing the positive prints directly from the original negatives. Furthermore, the complementary colors herein referred to may be varied, and it may be readily understood that any other set of complementary colors may be used if preferred.

Although certain specific embodiments of the present invention have been shown and described, many modifications thereof are possible, and the present disclosure should be construed only in an illustrative sense. The present invention, therefore, is not to be restricted except insofar as is necessitated by the prior art and the spirit of the appended claim.

I claim:

A process of producing a series of latent color component images in a bi-pack type of film consisting of an orthochromatic film containing a yellow dye capable of absorbing substantially all blue and green light that attempts to pass therethrough, and a panchromatic film, the two films being arranged with their emulsion coated surfaces together, said process comprising the division of an image bearing light pencil into two similar image bearing light pencils, the removal of yellow and green light from one of said light pencils, the removal of red and blue light from the other of said light pencils and the bringing to focus of both of said light pencils on the superimposed emulsions, from the side on which the orthochromatic emulsion is placed, whereby the light pencil from which yellow and green light has been removed forms a blue component image in the orthochromatic emulsion and a red component image in the panchromatic emulsion and the light beam from which the red and blue light has been removed forms a green component image in the orthochromatic emulsion and the yellow component image in the panchromatic emulsion.

OTTO C. GILMORE.